United States Patent
Gao

(10) Patent No.: US 8,084,109 B2
(45) Date of Patent: Dec. 27, 2011

(54) PVDC-POLYOLEFIN COEXTRUDED THERMAL-FORMED HIGH-BLOCKED COMPOSITE PACKAGING MATERIAL

(75) Inventor: Xuewen Gao, Suzhou (CN)

(73) Assignees: Jiangsu Caihua Packing Group Company, Kunshan (CN); J&A Industrial (Suzhou) Co., Ltd., Suzhou (CN); Kunshan Jiapu Packing Material Co., Ltd, Kunshan (CN)

( * ) Notice: Subject to any disclaimer, the term of this patent is extended or adjusted under 35 U.S.C. 154(b) by 536 days.

(21) Appl. No.: 12/226,313

(22) PCT Filed: Mar. 23, 2007

(86) PCT No.: PCT/CN2007/000944
§ 371 (c)(1),
(2), (4) Date: Oct. 23, 2008

(87) PCT Pub. No.: WO2007/131409
PCT Pub. Date: Nov. 22, 2007

(65) Prior Publication Data
US 2009/0155550 A1    Jun. 18, 2009

(30) Foreign Application Priority Data
May 15, 2006   (CN) .......................... 2006 1 0040449

(51) Int. Cl.
*B32B 1/02* (2006.01)
*B32B 7/02* (2006.01)
*H05B 6/00* (2006.01)
*B29C 47/06* (2006.01)
(52) U.S. Cl. ........ 428/35.7; 428/200; 264/464; 264/514
(58) Field of Classification Search .................. 428/200, 428/35.7; 264/464, 514
See application file for complete search history.

(56) References Cited

U.S. PATENT DOCUMENTS

| 4,572,854 | A | * | 2/1986 | Dallmann et al. ......... 206/524.1 |
| 4,780,258 | A | * | 10/1988 | Cloeren .................... 264/173.12 |
| 5,756,169 | A | * | 5/1998 | Peiffer et al. ................. 428/34.9 |
| 5,773,106 | A | * | 6/1998 | deGroot et al. .............. 428/35.7 |
| 2004/0086731 | A1 | | 5/2004 | Eggers et al. |

FOREIGN PATENT DOCUMENTS

| CN | 2227020 Y | 5/1996 |
| CN | 1251809 A | 5/2000 |
| CN | 2559598 Y | 7/2003 |
| CN | 1535814 A | 10/2004 |
| CN | 200610040449.6 | 7/2008 |
| JP | A 1-206010 | 8/1989 |
| JP | A 7-308994 | 11/1995 |

* cited by examiner

*Primary Examiner* — Rena Dye
*Assistant Examiner* — Erik Kashnikow
(74) *Attorney, Agent, or Firm* — Oliff & Berridge, PLC

(57) ABSTRACT

A composite packaging material includes a top film and a bottom film as the forming film. The up film is BOPP/PE-TIE-PVDC-TIE-PP-PE structure, which is co-extruded by multi-layer flow or inflation film and formed by a solventless dry way; the bottom films has a PP-TIE-PVDC-TIE-PE structure which is co-extruded by multi-layer flow or inflation film. PVDC is homopolymerization of the polyvinylidene chloride or the copolymer of the methyl acrylate or the vinyl chloride, PE is polyethylene or modified polyethylene, and PP is polypropylene or modified polypropylene. The composite packaging material can solve the problem of effective composite of the PVDC-polyolefin material in the condition of the co-extruding, has high oxygen and water resistance, and can be used for various packages of gasing, vacuumizing and thermal forming.

6 Claims, No Drawings

PVDC-POLYOLEFIN COEXTRUDED THERMAL-FORMED HIGH-BLOCKED COMPOSITE PACKAGING MATERIAL

FIELD OF THE INVENTION

The invention relates to a thermoforming sealing flexible packaging material possessing high barrier and thermal sealing property, and particularly to a PVDC-polyolefin coextrusion thermoforming high-barrier compound packaging material composed of two parts, a top film and a bottom film. This packaging material can be widely used as sealing flexible packaging for food, processed meat products, commodities, cosmetics, chemical products, agrochemicals, and war industry products. It meets the requirements of such various functional packaging as inflation or evacuation and thermoforming, and is especially suitable for various barrier applications in high humidity environment, such as high moisture barrier, oxygen barrier, oil barrier, and aroma conservation.

BACKGROUND OF THE INVENTION

A thermoforming sealing flexible package is a separate sealing package that is formed by two films in the following way: The bottom film is formed into a mold cavity by thermoforming and deep drawing; then an object to be packaged is put into the mold cavity; and finally a second thermal sealing is performed on all sides of the top and the bottom film via evacuation or inflation. The top film (cover film), as a display side of the package, is a multilayer compound film that is transparent or on that is printed graphic and text information of the packaged object; and the bottom film (lower film), as a forming side of the package, is a multilayer compound film suitable for thermoforming and deep drawing, and gets the second thermal sealing.

The thermoforming sealing flexible packaging has currently become a packaging technology widely accepted by the market, being characterized by its high barrier, good sealing, long durability, simple packaging, low cost, wide application scope, etc. However, in view of technology, its functions, properties and characteristics are finally dependent on particularity of the compound packaging material from the multilayer compound top and bottom film.

In the prior art, the multilayer coextrusion compound film is usually compoundly formed from multilayer materials with different functions through a coextrusion process. Theoretically, it possesses great flexibility on both function and structure, and the product can be flexibly designed and arranged according to different requirements on properties. For example, such materials as PA, EVOH and PVDC can be adopted to realize such functions as oxygen barrier and aroma conservation; such materials as EVA, PE, PP and PVDC can be adopted to realize such functions as water barrier; EVA, PE and MPE resin can be adopted to realize the thermal sealing function; and an adhesive resin can be adopted to realize an adhesive function. However, it is not easy to practically develop a flexible packaging material with an excellent cost performance. The main reasons are as below:

First, there is a conflict between property and price in material selection; that is, a material with excellent properties such as in barrier, deep drawing and strength usually has a higher price, and it is very difficult to obtain a product that is inexpensive and high in quality. For example, PA (nylon) is a high quality engineering plastic, which exhibits better properties in thermoforming, deep drawing, strength, etc., and can meet requirements of most occasions; however, it is expensive, being almost twice as much as a universal plastic PP (polypropylene).

Second, there is a conflict between material and process performance in the functional design; that is, though some materials possess excellent properties and can meet functional design requirements, there are a series of problems in processing. For example, when a material is formed by coextrusion, the material possessing excellent properties and functions such as in barrier, deep drawing, skin packaging, antipiercing and anti-pollution sealing against the product, it is usually subject to restriction in material selection for structure due to difference in processing conditions. For example, being a copolymer of vinylidene chloride and chloroethylene, PVDC (polyvinylidene chloride) possesses high crystallizability and very good combination barrier properties, and is a packaging material with high barrier and good tenacity as well as low-temperature thermal sealing, thermal contractility and chemical stability. Its biggest characteristic is that, without a hydrophilic group in the polymer, it possesses a good water-vapor barrier property, while its gas barrier property is independent on the environmental humidity. However, its weaknesses are that it is so soft that it is poor at operational property; it is strong in crystallizability and easy to be cracked and perforated, and has poor aging resistance; and particularly, being a typical thermally sensitive resin, it is very sensitive to temperature during the forming process, and highly inclined to decompose to produce chlorine gas and hydrogen chloride. Therefore, it will be very difficult to compoundly form at a time the thermally sensitive resin polyvinylidene chloride with other high-temperature molten resin materials (e.g. the temperature of nylon resin melt can be up to 300° C.). All the current merchant BOPA/PVDC/PE compound film is compounded from a BOPA film and a PVDC film, which are required to be first produced, respectively. Comparatively, though possessing better processing and barrier property, EVOH (ethylene-vinyl alcohol copolymer) has a biggest weakness that its barrier property decreases dramatically in a high humidity environment, i.e. it is good at oxygen barrier but poor at humidity barrier, and its oxygen barrier property decreases dramatically with temperature.

Third, there is a conflict between structure and process in the product design; that is, in the multilayer coextrusion compound film design, an asymmetrical structure, compared with a symmetrical structure, obviously possesses the advantage of considering the follow-up processing characteristic. However, it is because of this that the most outstanding problem is that the film is inclined to be curled during the coextrusion forming process. The mechanism is as below: During the coextrusion forming process of the asymmetrical structure formed by a crystalline resin and a noncrystalline resin under the same temperature and pressure, an unbalanced stress will surely be produced due to difference in crystalline temperature and velocity of the materials, thus directly curling the film. For example, when a product with a seven-layer asymmetrical structure is produced, the outer nylon layer and the inner polyethylene layer are different in crystalline temperature and velocity during the cooling process of molten coextrusion; that is, the crystalline temperature of nylon is 180° C.~140° C. while the crystalline temperature of polyethylene 120° C.~80° C.; therefore, nylon is first crystallized and shrinks by 2~3% to be set into solid, while polyethylene is then crystallized and solidified and shrinks by 2~3%, and finally the compound film is curled under action of the stress. This weakness not only makes winding of the film difficult, but also directly affects a future second processing of the compound film. For example, it is always difficult to produce bags and thermoform with the curled film.

The following conclusion can be drawn based on all mentioned above: For the flexible packaging film material from multilayer coextrusion compound forming, it is very difficult to design and develop a flexible packaging material with an excellent cost performance for a kind of packaged object.

SUMMARY OF THE INVENTION

The invention provides a PVDC-polyolefin coextrusion thermoforming high-barrier compound packaging material, so as to solve the technical problem that it is difficult for PVDC and polyolefin materials, due to such reasons as big difference in thermal sensitivity and stress balance between the crystalline resin and the noncrystalline resin, to combine to possess high barrier, thermoforming and deep drawing property under the conditions of multilayer cast or multilayer blowing film coextrusion forming.

In order to attain the above purpose, the invention adopts the following technical solution: A PVDC-polyolefin coextrusion thermoforming high-barrier compound packaging material is provided, which includes two parts, a top film and a bottom film; the top film, as a display side of the package, is a multilayer film that is transparent or on that is printed graphic and text information of the packaged object; and the bottom film, as a forming side of the package, is a multilayer film suitable for thermoforming, vacuum surface packaging or inflation packaging, and gets the second thermal sealing. Its innovation lies in the following aspects:

1. Top film (1) The top film is a film with seven or more layers, having a basic structure as below:

BOPP/PE-TIE-PVDC-TIE-PP-PE (2) Materials

In the top film structure:

① PVDC is selected from the following three film-class materials:

Homopolymerized polyvinylidene chloride;

copolymer of methyl acrylate and polyvinylidene chloride; and copolymer of chloroethylene and polyvinylidene chloride.

② PE is polyethylene or modified PE with a density of $0.92\pm0.03$ g/cm$^3$ that is a mixture of polyethylene and at least one of the following four materials:

Metallocene polyethylene, with a density of 0.86~0.94 g/cm$^3$;

thermoplastic polyolefin elastomer, with a density of 0.86~0.905 g/cm$^3$;

metal-ion polymer of sodium and zinc, with a density of 0.92~0.94 g/cm$^3$; and ethylene-vinyl acetate copolymer, with a density of 0.92~0.945 g/cm$^3$.

(3) Process

Multilayer cast or multilayer blowing film coextrusion is adopted for forming of the PE-TIE-PVDC-TIE-PP-PE, which is compounded with BOPP in a solventless dry way.

2. Bottom film (1) The bottom film is a film with five or more layers, having a basic structure as below:

PP-TIE-PVDC-TIE-PE (2) Materials

In the bottom film structure:

① PP is polypropylene or modified PP with a density of $0.91\pm0.03$ g/cm$^3$ that is a mixture of polypropylene and at least one of the following four materials:

Metallocene polyethylene, with a density of 0.86~0.94 g/cm$^3$;

thermoplastic polyolefin elastomer, with a density of 0.86~0.905 g/cm$^3$;

ethylene-vinyl acetate copolymer, with a density of 0.92~0.945 g/cm$^3$; and high-density polyethylene, with a density of 0.94~0.96 g/cm$^3$.

② PVDC is the same with that in the top film.

③ PE is the same with that in the top film.

(3) Process

Multilayer cast or multilayer blowing film coextrusion is adopted for forming of the PP-TIE-PVDC-TIE-PE.

The relevant contents in the above technical solution are explained as below:

1. In the above-mentioned solution, BOPP stands for two-way stretched polypropylene, and TIE for adhesive resin. In the structure of the top and the bottom film, "/" stands for solventless dry-type compound forming, and "-" for multilayer cast or multilayer blowing film coextrusion compound forming. Density of the basic polypropylene is 0.89~0.91 g/cm$^3$, and density of the basic polyethylene 0.89~0.91 g/cm$^3$.

2. In the above-mentioned solution, the top film is a film with seven or more layers; and the "basic structure" refers to the minimal seven-layer basic structure and its material arrangement, based on which can a film with more than seven layers be produced by insertion of other layers, thus implying an open meaning, e.g. BOPP/PE-TIE-PVDC-TIE-LDPE-modified PE1-PP-modified PE2. For the same reason, the bottom film is a film with five or more layers, also implying an open meaning, e.g. PP-modified PE1-LDPE-TIE-PVDC-TIE-LDPE-modified PE2.

3. In the above-mentioned solution, between PVDC and PP in the structure of the top and the bottom film is included a heat insulating bridge, which forms a temperature gradient via at least one layer of transitional heat-insulating materials, thus establishing the temperature difference transition from the high-melting-point non-thermally-sensitive resin PP to the thermally sensitive resin PVDC under the coextrusion condition. The transitional heat-insulating material is better selected from high polymers with temperature tolerance between PVDC and PP, and possesses thermal viscosity with at least one of the two materials, PVDC and PP, such as LDPE, LLDPE, EVA, modified PE, and modified PP.

4. In the above-mentioned solution, it is preferred to print graphic and text information of the packaged object on the inner side of BOPP; besides, graphic and text information of the packaged object can also be printed on the outer side (surface) of BOPP, or a mark on that is printed graphic and text information of the packaged object can be attached to the outer side of BOPP.

Because of application of the above technical solution, the present invention has the following advantages and effects compared to the prior art:

1. In order to obtain a coextrusion compound film product with a melt processing temperature difference up to 125° C. between the thermally-sensitive resin layer (PVDC) and the non-thermally-sensitive resin layer (PP), the heat insulating bridge is positioned between them that is an assembly of resin layers possessing the heat insulating function; making use of combination of three main factors, i.e. number of the resin layers, different thermal resistance of the materials, and thickness of the materials, the temperature difference of the melt processing is transited gradually in a gradient manner so as to meet the processing requirements of coextrusion blow molding or cast film forming processing. In this way, the technical problem is solved with coextrusion compound forming processing of the thermally sensitive resin and the non-thermally-sensitive resin with a resin possessing greatly different thermal resistance, and a most effective functional combination is achieved by integrating PVDC with the polyolefin material.

2. In the top film structure, the invention establishes an anti-curling stress-balancing structure with BOPP and the PP resin in PE-TIE-PVDC-TIE-PP-PE. The invention, making use of the same characteristics of the same kind or the same sort of materials, offsets stress unbalance between other layers resulted from different crystallization temperature, thus solving the problem that BOPP, as a surface layer, is warped due to an internal stress when being compounded with the PE-TIE-PVDC-TIE-PP-PE, and ensuring that the product can still keep level without warping after being processed by pasteurization.

3. In addition to such advantages as high mechanical property possessed by the original polypropylene resin, the modified PP (modified polypropylene) that the invention relates to further possesses better flow property as well as higher economy and processing property, and can meet requirements of consecutive and automatic thermoforming. The modified polypropylene, with the specific weight about $0.91\pm0.03$ g/cm$^3$, due to application of a special technology, has a reduced friction among material particles, thus improving thermoforming property of the product, meeting the requirement of the product for deep drawing property instead of PA, and guaranteeing the thickness required by the four drawn corners. The modified polypropylene can be used to form high performance products with a complicated shape, and has not only excellent wall thickness distribution, but also a very good appearance.

4. The modified PP of the invention further has a wider temperature zone than the traditional PP, and therefore this material much facilitates processing. Based on mixture of the basic polymer and the metallocene polyethylene, as well as the thermoplastic polyolefin elastomer and the ethylene-vinyl acetate copolymer, PP is endowed with higher melt strength and good ductility, which are critical for the deep drawing quality.

5. In addition to economy and processing property of the original polyethylene, the modified PE (modified polyethylene) of the invention, with the specific weight about $0.92\pm0.03$ g/cm$^3$, can meet the requirements of polyethylene on thermal sealing, and further possesses better melt strength, anti-pollution property and antipiercing property, as well as better skin packaging property. Besides, the modified PE of the invention has a reduced gap and friction between the film and the packaged object, thus improving skin packaging property of the product, making the packaging material and the packaged object close to each other to form a whole, avoiding food putrefaction caused by water effluent of the product, and consumedly prolonging shelf life of the product.

6. The modified PE of the invention further possesses a wider temperature zone, a lower thermal sealing temperature, and a higher thermal viscosity than the traditional class PE, and therefore this material much facilitates processing. Based on mixture of the basic polymer and the metallocene polyethylene, the thermoplastic polyolefin elastomer and the metal-ion polymer as well as vinyl acetate, PE is endowed with very high melt strength and good ductility, as well as a good anti-pollution sealing and outstanding skin packaging property, both of which are critical for the sealing pollution intensity, the skin packaging property and the deep drawing quality.

7. The invention adopts the homopolymerized PVDC or the PVDC that is copolymerized with MA (methyl acrylate) or VC (chloroethylene) as the barrier material, ensuring that the packaging material in a high humidity environment still possesses excellent oxygen barrier property, and possesses high moisture and oxygen barrier property at the same time.

In conclusion, the thermoforming packaging material of the invention. composed of the top and the bottom film is mainly obtained by multilayer cast or multilayer blow molding coextrusion processing. It has the following features: First, the product possesses high oxygen and water vapor barrier property as well as antipiercing property, and possesses stronger anti-grease. and anti-pollution property at the sealing, thus avoiding leaking caused by sealing pollution. Second, the product possesses very good skin packaging property, excellent thermoforming property and wall thickness distribution, as well as very good appearance, thus meeting requirements of such various functional packaging as inflation, evacuation and thermoforming; especially, the product still possesses high moisture and oxygen barrier property in a high humidity environment.

DETAILED DESCRIPTION OF THE EMBODIMENTS

The invention will be further described below with reference to embodiments.

Embodiment 1

A PVDC-polyolefin coextrusion thermoforming high-barrier compound packaging material is provided that is used for corn hotdog sausage.

The corn hotdog sausage is produced by a famous meat processing plant of China. In order to produce the corn flavor, artificial spice is not adopted for seasoning this product; instead, intact natural sweet corn grains are used as an additive in the hotdog sausage, with an adding proportion of about 3~5% of the total weight. Because of a great amount of water and sugar contained in the sweet corn, the product will be deteriorated if there is an overflow of corn juice, thus resulting in a shortened shelf life. Besides, a single package is adopted for this product (50 g/pack), which needs drawing packaging.

In order to meet customers' requirements for processing and shelf life, the invention develops the PVDC-polyolefin coextrusion thermoforming high-barrier compound packaging material.

This thermoforming sealing flexible packaging material includes two parts, the top film and the bottom film. The top film, as a display side of the package, is a multilayer film that is transparent or on that is printed graphic and text information of the packaged object; and the bottom film, as a forming side of the package, is a multilayer film suitable for thermoforming and vacuum surface packaging, and gets the second thermal sealing. Refer to the following for details:

The top film is a seven-layer film, having a structure of BOPP/PE-TIE-PVDC-TIE-PP-modified PE.

Where:

① PVDC is selected from the following three film-class materials:

Homopolymerized polyvinylidene chloride;
copolymer of methyl acrylate and polyvinylidene chloride; and
copolymer of chloroethylene and polyvinylidene chloride.

② The modified PE, with a density of $0.92\pm0.03$ g/cm$^3$, is a mixture of polyethylene and at least one of the following four materials. Refer to the following table for details:

| Modified PE | Basic PE 0.89~0.91 g/cm³ | Metallocene polyethylene 0.86~0.94 g/cm³ | Thermoplastic polyolefin elastomer 0.86~0.905 g/cm³ | Ethylene-vinyl acetate copolymer 0.92~0.945 g/cm³ | Metal-ion polymer of sodium and zinc 0.92~0.94 g/cm³ | Density g/cm³ |
|---|---|---|---|---|---|---|
| Formulation 1 | 60% | 40% | | | | 0.9000 |
| Formulation 2 | 5% | | | | 95% | 0.9285 |
| Formulation 3 | 90% | | 10% | | | 0.8983 |
| Formulation 4 | 85% | | | 15% | | 0.9053 |
| Formulation 5 | 35% | 45 | 10% | 10% | | 0.9018 |
| Formulation 6 | 70% | 15% | | 15% | | 0.9053 |
| Formulation 7 | 30% | 50% | 10% | | 10% | 0.9013 |
| Formulation 8 | 30% | 50% | 20% | | | 0.8965 |
| Formulation 9 | 10% | | 20% | | 70% | 0.9175 |
| Formulation 10 | 79% | | 20% | 9% | | 0.9717 |
| Formulation 11 | 40% | 10% | | 10% | 40% | 0.9155 |
| Formulation 12 | 63% | | 12% | 5% | 20% | 0.9057 |
| Formulation 13 | 30% | 30% | 5% | 5% | 30% | 0.9099 |

③ BOPP is the two-way stretched polypropylene, on whose inner side is printed graphic and text information of the corn hotdog sausage.

④ TIE is adhesive resin.

⑤ PE is polyethylene.

⑥ PP is polypropylene.

Manufacturing process: Multilayer cast or multilayer blowing film coextrusion is adopted for forming of the PE-TIE-PVDC-TIE-PP-modified PE, which is compounded with BOPP in a solventless dry way.

from the high polymers with temperature tolerance between PVDC and PP. For example, at least one layer of refractory TIE or/and low-density PP is used as the heat insulating bridge.

The bottom film is a five-layer film, having a structure as below:

Modified PP-TIE-PVDC-TIE-modified PE

Where:

① The modified PP, with a density of 0.91±0.03 g/cm³, is a mixture of polypropylene and at least one of the following four materials. Refer to the following table for details:

| Modified PP | Basic PP 0.89~0.91 g/cm³ | Metallocene polyethylene 0.86~0.94 g/cm³ | Thermoplastic polyolefin elastomer 0.86~0.905 g/cm³ | Ethylene-vinyl acetate copolymer 0.92~0.945 g/cm³ | High-density polyethylene 0.94~0.96 g/cm³ | Density g/cm³ |
|---|---|---|---|---|---|---|
| Formulation 1 | 80% | | 20% | | | 0.8965 |
| Formulation 2 | 75% | 25 | | | | 0.9000 |
| Formulation 3 | 70% | | | | 30% | 0.9175 |
| Formulation 4 | 86% | | | 14% | | 0.9049 |
| Formulation 5 | 60% | 30% | 10% | | | 0.8983 |
| Formulation 6 | 60% | 15% | | | 25% | 0.9125 |
| Formulation 7 | 70% | 20% | | 10% | | 0.9035 |
| Formulation 8 | 30% | 0% | 0% | 10% | 60% | 0.9335 |
| Formulation 9 | 45% | 25% | 15% | | 15% | 0.9049 |
| Formulation 10 | 55% | 25% | 10% | 10% | | 0.9018 |
| Formulation 11 | 70% | | 25% | | 5% | 0.8981 |
| Formulation 12 | 75% | | 18% | 10% | | 0.9274 |
| Formulation 13 | 05% | 10% | 7% | 5% | 28% | 0.9145 |

In the top film, BOPP/PE-TIE-PVDC-TIE-PP-modified PE is compounded in the solventless dry way; an anti-curling stress balancing structure is established with BOPP and the PP resin in PE-TIE-PVDC-TIE-PP-modified PE; by means of the same properties of the same kind of materials, the stress unbalance between other layers due to different crystallization temperature is balanced out; and thus the warping due to the internal stress is avoided when BOPP as the surface layer is compounded with the PE-TIE-PVDC-TIE-PP-modified PE, and the product can be guaranteed to keep neat without warping after pasteurization processing.

Between PVDC and PP in the top film structure is included a heat insulating bridge, which forms a temperature gradient with at least one layer of transitional heat-insulating material, thus establishing a temperature difference transition under the coextrusion condition from the high melting-point non-thermally-sensitive resin PP to the thermally-sensitive resin PVDC. The transitional heat-insulating material is selected ② PVDC is the same with that in the top film.

③ The modified PE is the same with that in the top film.

Manufacturing process: Multilayer cast or multilayer blowing film coextrusion is adopted for forming of the modified PP-TIE-PVDC-TIE-modified PE.

Between PVDC and PP in the bottom film structure is included a heat insulating bridge, which is the same with that in the top film, and will no longer be described again here.

In conclusion, this embodiment solves the technical problem with the coextrusion compound forming processing of the thermally-sensitive resin (easy to be decomposed) and the non-thermally-sensitive resin with a synthetic resin possessing greatly different thermal resistance; it avoids warping of the top film caused by the internal stress, and guarantees that the product can be kept neat without warping after pasteurization processing; it improves thermoforming property of the product, meets requirements of the product for deep drawing property instead of PA, and guarantees the thickness required by the four drawn corners; it improves skin packaging property of the product, making the packaging material and the packaged object close to each other to form a whole, avoiding food putrefaction caused by water effluent of the product, and prolonging shelf life of the product; it ensures that the packaging material in a high humidity environment still possesses excellent oxygen barrier property, and possesses high moisture and oxygen barrier property at the same time.

Embodiment 2

A PVDC-polyolefin coextrusion thermoforming high-barrier compound packaging material is provided.

This thermoforming sealing flexible packaging material includes two parts, the top film and the bottom film. The top film, as a display side of the package, is a multilayer film that is transparent or on that is printed graphic and text information of the packaged object; and the bottom film, as a forming side of the package, is a multilayer film suitable for thermoforming and vacuum surface packaging, and gets the second thermal sealing. Refer to the following for details:

The top film is a film with more than seven layers, having a structure as below:

BOPP/PE-TIE-PVDC-TIE-LDPE-modified PE1-PP-modified PE2

Where:

LDPE: low-density polyethylene;

the modified PE1 is the modified PE made from mixture of polyethylene and the metallocene polyethylene; refer to the formulation in the table of modified PE in the top film of Embodiment 1;

the modified PE2 is the modified PE made from mixture of polyethylene and the metal-ion resin of sodium and zinc; refer to the formulation in the table of modified PE in the top film of Embodiment 1; and other materials are the same with those in the top film of Embodiment 1.

Manufacturing process: Multilayer cast or multilayer blowing film coextrusion is adopted for forming of the PE-TIE-PVDC-TIE-LDPE-modified PE1-PP-modified PE2, which is compounded with BOPP in a solventless dry way.

Stress balance:

In the top film, BOPP/PE-TIE-PVDC-TIE-LDPE-modified PE1-PP-modified PE2 is compounded in the solventless dry way; an anti-curling stress balancing structure is established with BOPP and the PP resin in PE-TIE-PVDC-TIE-PP-modified PE; by means of the same properties of the same kind of materials, the stress unbalance between other layers due to different crystallization temperature is balanced out; and thus the warping due to the internal stress is avoided when BOPP as the surface layer is compounded with the PE-TIE-PVDC-TIE-LDPE-modified PE1-PP-modified PE2, and the product can be guaranteed to keep neat without warping after pasteurization processing.

Heat insulating bridge:

Between PVDC and PP in the top film structure is included a heat insulating bridge, which forms a temperature gradient with three layers (TIE-LDPE-modified PE 1) of transitional heat-insulating materials, thus establishing a temperature difference transition under the coextrusion condition from the high melting-point non-thermally-sensitive resin PP to the thermally-sensitive resin PVDC. The transitional heat-insulating material is selected from the high polymers with temperature tolerance between PVDC and PP, i.e. PVDC<TIE<LDPE<modified PE1<PP.

The bottom film is a film with more than five layers, having a structure as below:

PP-modified PE1-LDPE-TIE-PVDC-TIE-LDPE-modified PE2

Where:

LDPE: low-density polyethylene;

the modified PE1 is the modified PE made from mixture of polyethylene and the metallocene polyethylene; refer to the formulation in the table of modified PE in the top film of Embodiment 1;

the modified PE2 is the modified PE made from mixture of polyethylene and the metal-ion resin of sodium and zinc; refer to the formulation in the table of modified PE in the top film of Embodiment 1;

PP is polypropylene; and other materials are the same with those in the bottom film of Embodiment 1.

Manufacturing process: Multilayer cast or multilayer blowing film coextrusion is adopted for forming of the PP-modified PE1-LDPE-TIE-PVDC-TIE-LDPE-modified PE2.

Heat insulating bridge: Being the same with that in the top film.

Embodiment 3

A PVDC-polyolefin coextrusion thermoforming high-barrier compound packaging material is provided.

This thermoforming sealing flexible packaging material includes two parts, the top film and the bottom film. The top film, as a display side of the package, is a multilayer film that is transparent or on that is printed graphic and text information of the packaged object; and the bottom film, as a forming side of the package, is a multilayer film suitable for thermoforming and vacuum surface packaging, and gets the second thermal sealing. Refer to the following for details:

The top film is a film with more than seven layers, having a structure as below:

BOPP/PE-TIE-PVDC-TIE-LDPE-HDPE-PP-modified PE

Where:

LDPE: low-density polyethylene;

HDPE: high-density polyethylene;

the modified PE is made from mixture of polyethylene and EVA (ethylene-vinyl acetate copolymer); refer to the formulation in the table of modified PE in the top film of Embodiment 1; and other materials are the same with those in the top film of Embodiment 1.

Manufacturing process: Multilayer cast or multilayer blowing film coextrusion is adopted for forming of the PE-TIE-PVDC-TIE-LDPE-HDPE-PP-modified PE, which is compounded with BOPP in a solventless dry way.

Stress balance:

In the top film, BOPP/PE-TIE-PVDC-TIE-LDPE-HDPE-PP-modified PE is compounded in the solventless dry way; an anti-curling stress balancing structure is established with BOPP and the HDPE-PP resin in PE-TIE-PVDC-TIE-LDPE-HDPE-PP-modified PE; by means of the same properties of the same kind of materials, the stress unbalance between other layers due to different crystallization temperature is balanced out; and thus the warping due to the internal stress is avoided when BOPP as the surface layer is compounded with the PE-TIE-PVDC-TIE-LDPE-HDPE-PP-modified PE, and the product can be guaranteed to keep neat without warping after pasteurization processing.

Heat insulating bridge:

Between PVDC and PP in the top film structure is included a heat insulating bridge, which forms a temperature gradient with three layers (TIE-LDPE-HDPE) of transitional heat-insulating materials, thus establishing a temperature difference transition under the coextrusion condition from the high melting-point non-thermally-sensitive resin PP to the thermally-sensitive resin PVDC. The transitional heat-insulating material is selected from the high polymers with temperature tolerance between PVDC and PP, i.e. PVDC<TIE<LDPE<HDPE<PP.

The bottom film is a film with more than five layers, having a structure as below:

PP-HDPE-LDPE-TIE-PVDC-TIE-LDPE-modified PE

Where:

LDPE: low-density polyethylene;

HDPE: high-density polyethylene;

the modified PE is made from mixture of polyethylene and the sodium ion resin; refer to the formulation in the table of modified PE in the top film of Embodiment 1;

PP is the modified PP made from mixture of polypropylene and the thermoplastic polyolefin elastomer; refer to the formulation in the table of modified PP in the top film of Embodiment 1; and other materials are the same with those in the bottom film of Embodiment 1.

Manufacturing process: Multilayer cast or multilayer blowing film coextrusion is adopted for forming of the PP-HDPE-LDPE-TIE-PVDC-TIE-LDPE-modified PE.

Heat insulating bridge: Being the same with that in the top film.

The embodiments above are presented only for describing technical concepts and characteristics of the invention. Their purpose is to make one skilled in the art understand and implement the invention. They cannot thereby limit the extent of protection of the invention. Any equivalent change or modification according to the spiritual essence of the invention should all be covered in the extent of protection of the invention.

What is claimed is:

1. A PVDC-Polyolefin co-extruded thermal-formed high-blocked composite packaging material, comprising: a top film and a bottom film having a cavity therebetween for containing a packaged object; wherein the top film, as a display side of a package, is a multilayer film that is transparent or is printed thereon graphic and text information of the packaged object; and the bottom film, as a forming side of the package, is a multilayer film suitable for thermoforming, vacuum surface packaging or inflation packaging, and has a thermal sealing;

wherein:

a. the top film is a film with seven or more layers, having a basic structure as below:

BOPP/PE-TIE-PVDC-TIE-PP-PE i. PVDC is selected from one of the following three film-class materials:

homopolymerized polyvinylidene chloride;

copolymer of methyl acrylate and polyvinylidene chloride; and copolymer of chloroethylene and polyvinylidene chloride;

ii. PE is polyethylene or modified polyethylene with a density of $0.92\pm0.03$ g/cm$^3$ that is a mixture of polyethylene and at least one of the following four materials:

metallocene polyethylene, with a density of 0.86~0.94 g/cm$^3$;

thermoplastic polyolefin elastomer, with a density of 0.86~0.905 g/cm$^3$;

metal-ion polymer of sodium and zinc, with a density of 0.92~0.94g/cm$^3$; and ethylene-vinyl acetate copolymer, with a density of 0.92~0.945 g/cm$^3$;

iii. BOPP is biaxially oriented polypropylene;

iv. TIE is adhesive resin;

v. PP is polypropylene;

vi. "/" stands for solventless dry-type compound forming and "-" stands for multilayer cast or multilayer blowing film coextrusion compound forming; and vii. the PE-TIE-PVDC-TIE-PP-PE is formed by multilayer cast or multilayer blowing film coextrusion, and is compounded with BOPP in a solventless dry way;

b. the bottom film is a film with five or more layers, having a basic structure as below:

PP-TIE-PVDC-TIE-PE i. PP is polypropylene or modified polypropylene with a density of $0.91\pm0.03$ g/cm$^3$ that is a mixture of polypropylene and at least one of the following four materials:

metallocene polyethylene, with a density of 0.86~0.94 g/cm$^3$;

thermoplastic polyolefin elastomer, with a density of 0.86~0.905 g/cm$^3$;

ethylene-vinyl acetate copolymer, with a density of 0.920.945 g/cm$^3$; and high-density polyethylene, with a density of 0.94~0.96 g/cm$^3$;

ii. PVDC is the same with that in the top film;

iii. PE is the same with that in the top film; and iv. the PP-TIE-PVDC-TIE-PE is formed by multilayer cast or multilayer blowing film coextrusion.

2. The composite packaging material according to claim 1, wherein between PVDC and PP in the top and the bottom film structure is included a heat insulating bridge, which forms a temperature gradient with at least one layer of transitional heat-insulating materials, thus establishing a temperature difference transition under the coextrusion condition from the high melting-point non-thermally-sensitive resin PP to the thermally-sensitive resin PVDC.

3. The composite packaging material according to claim 2, wherein the transitional heat-insulating material is selected from high polymers with temperature tolerance between PVDC and PP, and possesses thermal viscosity with at least one of the two materials, PVDC and PP.

4. The composite packaging material according to claim 1, wherein graphic and text information of the packaged object is printed on the inner or outer side of BOPP.

5. The composite packaging material according to claim 1, wherein the top film is a nine-layer structure as below:

BOPP/PE-TIE-PVDC-TIE-LDPE-modified PE1-modified PE2, where "-TIE-LDPE-modified PE1-" is a heat insulating bridge.

6. The composite packaging material according to claim 1, wherein the bottom film is an eight-layer structure as below:

PP-modified PE1-LDPE-TIE-PVDC-TIE-LDPC-modified PE2, where "modified PE1-LDPE-TIE-" is a heat insulating bridge.

* * * * *